United States Patent
Ivans et al.

(10) Patent No.: US 11,542,020 B2
(45) Date of Patent: Jan. 3, 2023

(54) ELECTRIC AIRCRAFT SIDE ACCESS BATTERIES AND SINGLE FILE PASSENGER SEATING

(71) Applicant: Bell Textron Inc., Fort Worth, TX (US)

(72) Inventors: Steven R. Ivans, Ponder, TX (US); Kirk L. Groninga, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 85 days.

(21) Appl. No.: 17/161,986

(22) Filed: Jan. 29, 2021

(65) Prior Publication Data

US 2022/0242584 A1 Aug. 4, 2022

(51) Int. Cl.
| | | |
|---|---|---|
| *B64D 27/24* | (2006.01) | |
| *B64D 11/06* | (2006.01) | |
| *B60L 50/60* | (2019.01) | |
| *B64C 1/16* | (2006.01) | |
| *B64C 1/14* | (2006.01) | |
| *B64C 29/00* | (2006.01) | |
| *B64F 5/10* | (2017.01) | |

(52) U.S. Cl.
CPC .............. *B64D 27/24* (2013.01); *B60L 50/60* (2019.02); *B64C 1/1423* (2013.01); *B64C 1/1484* (2013.01); *B64C 1/16* (2013.01); *B64C 29/00* (2013.01); *B64D 11/0601* (2014.12); *B64F 5/10* (2017.01); *B60L 2200/10* (2013.01)

(58) Field of Classification Search
CPC ... B64C 1/1423; B64C 29/00; B64D 11/0601; B64D 27/24; B60L 50/60; B60L 50/61; B60L 50/66; B60L 50/70; B60L 50/75
See application file for complete search history.

(56) References Cited

U.S. PATENT DOCUMENTS

| | | | |
|---|---|---|---|
| 8,511,237 B2 * | 8/2013 | Morita | H01M 10/658 |
| | | | 105/51 |
| 2016/0009402 A1 * | 1/2016 | Hunter | B64D 27/02 |
| | | | 244/53 R |
| 2017/0158306 A1 * | 6/2017 | Kooiman | B64C 1/26 |
| 2019/0337613 A1 * | 11/2019 | Villa | B64C 27/10 |
| 2020/0108935 A1 * | 4/2020 | Schuttera | B64D 11/0627 |
| 2020/0298967 A1 | 9/2020 | Smith et al. | |
| 2021/0009265 A1 * | 1/2021 | Belik | B64C 25/52 |
| 2021/0061490 A1 * | 3/2021 | Heironimus | B60L 58/26 |

\* cited by examiner

*Primary Examiner* — Joshua J Michener
*Assistant Examiner* — Cindi M Curry
(74) *Attorney, Agent, or Firm* — Frost Brown Todd LLC (57) ABSTRACT

An aircraft includes fuselage, a seat, and battery compartment. Fuselage extends along a longitudinal axis. Seat is configured to support a passenger. The battery compartment that includes a battery configured to provide power to propel the aircraft. The battery compartment, including the battery, is located laterally adjacent to the seat along the longitudinal axis.

20 Claims, 8 Drawing Sheets

ELECTRIC AIRCRAFT SIDE ACCESS BATTERIES AND SINGLE FILE PASSENGER SEATING

TECHNICAL FIELD

The present disclosure is directed to aircraft systems, and more particularly to placement of one or more batteries relative to passenger seating of an electric aircraft.

BACKGROUND OF THE INVENTION

An electric aircraft may utilize a high volume of batteries to partially or fully propel the aircraft. As used herein, an electric aircraft is intended to refer to an aircraft that is powered entirely using electric power as well as a hybrid aircraft that uses a combination of electric power and another power source (e.g., a combustion engine) to propel the aircraft. Placement of these batteries may affect aircraft weight, aircraft balance, and/or ease of aircraft maintenance. For example, ease of aircraft maintenance may include the ease to access, charge, repair, inspect, and/or replace one or more batteries.

BRIEF SUMMARY OF THE INVENTION

In some examples, an aircraft includes a fuselage extending along a longitudinal axis, a seat configured to support a passenger, and a battery compartment that includes a battery configured to provide power to propel the aircraft. The battery compartment, including the battery, is located laterally adjacent to the seat along the longitudinal axis.

In some examples, the first and second seats extend in a straight line parallel to the longitudinal axis. In other examples, the first and second seats are staggered along the longitudinal axis such that the first and second seats do not extend in a straight line parallel to the longitudinal axis.

In some examples, an aircraft includes a fuselage, a plurality of seats, and a battery compartment. The fuselage extends along a longitudinal axis. The fuselage has an interior and an exterior. The plurality of seats is disposed in the interior of the fuselage. The plurality of seats include a first seat configured to support a first passenger, and a second seat configured to support a second passenger such that the first and second are arranged in single file. The battery compartment includes a battery and an access panel. The battery is configured to provide power to propel the aircraft. The battery compartment, including the battery, is located laterally adjacent to at least one of the single seats of the first and second passenger rows along the longitudinal axis. The access panel is movable between open and closed configurations to access the battery in the battery compartment from the exterior of the fuselage.

In some examples, a method of manufacturing an aircraft includes coupling a battery compartment, which includes a battery, within a fuselage of the aircraft. The fuselage extends along a longitudinal axis. The battery is configured to provide power to propel the aircraft. The method also includes coupling a seat with the fuselage so that the battery compartment, including the battery, is located laterally adjacent to the seat along the longitudinal axis. The seat is configured to support a passenger.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

I. Exemplary Aircrafts

A. Exemplary Electric Rotorcraft

Figure 1:
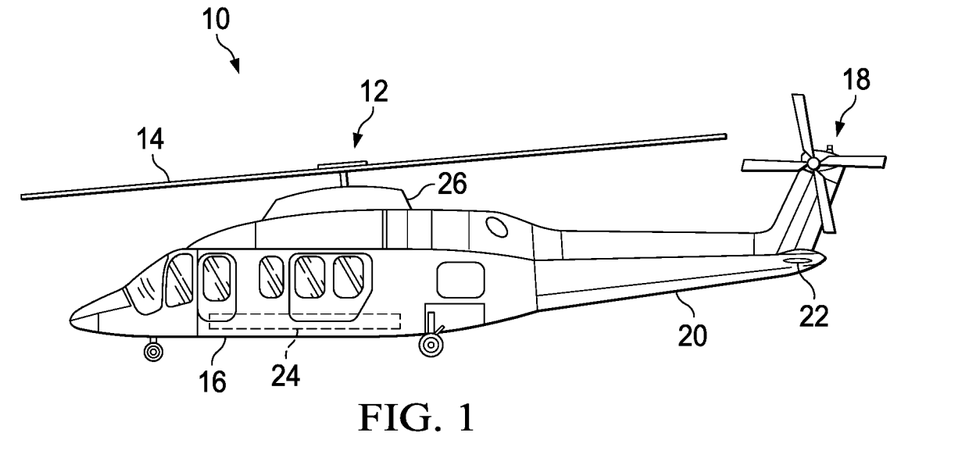
FIG. 1 is side plan view of a first exemplary electric aircraft.

FIG. 1 shows a first exemplary electric aircraft in the form of a rotorcraft (10). Rotorcraft (10) includes a rotor system (12) with a plurality of rotor blades (14). The pitch of each rotor blade (14) may be managed or adjusted to selectively control direction, thrust, and lift of rotorcraft (10). As shown, rotorcraft (10) includes a fuselage (16), a tail rotor or anti-torque system (18), an empennage (20), a tail structure (22), and a battery compartment (24). An airframe (not shown) supports fuselage (16) and defines the battery compartment (24). As shown, tail structure (22) may be used as a horizontal stabilizer. Torque is supplied to rotor system (12) and anti-torque system (18) using at least one engine. Rotorcraft (10) includes a variety of fairing and/or cowling assemblies (e.g., upper cowling assembly (26)) configured to cover or protect components of rotorcraft (10) and to reduce aerodynamic drag. Rotor system (12) is coupled to the airframe and, during operating, transmits vibrations to the airframe. Battery compartment (24) houses one or more batteries, such as electric-vehicle batteries, that may supply power to rotor system (12). As shown, battery compartment (24) is disposed below the floor of the passenger compartment of fuselage (16). Positioning battery compartment (24) below the floor of the passenger compartment of fuselage (16) may increase the usable volume of the passenger cabin disposed inside of fuselage (16).

B. Exemplary Electric Tiltrotor Aircraft

Figure 2:
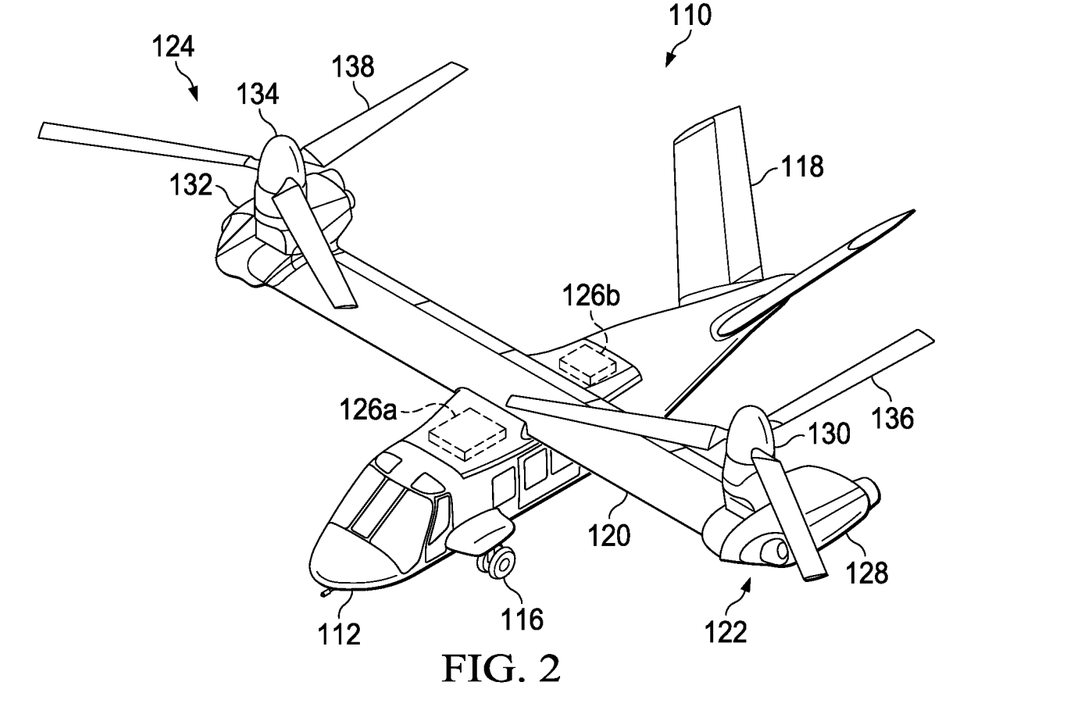
FIG. 2 is a top perspective view of aa second exemplary electric aircraft.

FIG. 2 shows a second exemplary electric aircraft in the form of a tiltrotor aircraft (110). Tiltrotor aircraft (110) includes an airframe (112) that supports a fuselage (114), a landing gear (116), a tail member (118), a wing (120), drive systems (122, 124), and battery compartments (126a-b). Battery compartments (126a-b) are disposed above the passenger compartment of fuselage (114). Airframe (112) at least in part defines the battery compartments (126a-b). Drive systems (122, 124) are coupled to airframe (112) and, during operating, transmit vibrations to airframe (112). Battery compartments (126a-b) house one or more batteries which may supply power to drive systems (122, 124). Battery compartments (126a-b) are disposed above the ceiling of the passenger compartment of fuselage (114) or inside the wings. Placing the battery compartments (126a-b) near wing (120) shortens the distance between battery compartments (126a-b) and drive systems (122, 124). Battery compartments (126a-b) may be below the floor of the passenger cabin that contains the passenger(s).

Drive system (122) includes a fixed engine (128) and a proprotor (130). Similarly, drive system (124) includes a fixed engine (132) and a proprotor (134). Each of proprotors (130, 134) is rotatable and includes a respective plurality of rotor blades (136, 138). The position of proprotors (130, 134) and the pitch of rotor blades (136, 138) may be selectively controlled to selectively control direction, thrust, and lift of tiltrotor aircraft (110). While drive systems (122, 124) are illustrated in the context of tiltrotor aircraft (110), drive systems (122, 124) may be implemented on other tiltrotor aircraft. For example, in other embodiments, drive systems (122, 124) may be used with an unmanned version of tiltrotor aircraft (110). Drive systems (122, 124) may be integrated into a variety of tiltrotor aircraft configurations. Additional aspects of rotorcraft (10) and tiltrotor aircraft (110) are shown and described in U.S. Pat. Pub. No. 2020/0298967, entitled "Vibration Attenuation System for Electric and Hybrid Electric Vehicles," published Sep. 24, 2020, the disclosure of which is incorporated by reference herein. It is alternatively envisioned that proprotors (130, 134) may be fixed and thus not rotatable.

II. Exemplary Electric Aircraft with Side Access Batteries

As previously described, rotorcraft (10) includes a battery compartment (24) that is disposed below the floor of the passenger compartment of fuselage (16), and tiltrotor aircraft (110) includes battery compartments (126a-b) that are disposed above the ceiling of the passenger compartment of fuselage (114). While placing battery compartments (24, 126a-b) below the floor of the passenger compartment of rotorcraft (10) or above the ceiling of the passenger compartment of tiltrotor aircraft (110) may increase the usable floorspace of rotorcraft (10) or tiltrotor aircraft (110), such positions may make it difficult to access, recharge, inspect, and/or replace the batteries. As a result, it may be desirable to locate the batteries in a more accessible location for convenient recharging, inspection, and/or replacement. Battery compartments (218, 318, 418, 518a-b) allow for side access of fuselages (212, 312, 412, 512) to provide for convenient recharging, inspection, and/or replacement of batteries.

A. First Exemplary Fuselage

FIGS. 3A-5 show a third exemplary electric aircraft in the form of a rotorcraft (210). Rotorcraft (210), e.g., a helicopter, may be configured for vertical takeoff and landing, similar to rotorcraft (10) and tiltrotor aircraft (110). Rotorcraft (210) includes a first exemplary fuselage (212), a plurality of rows (214a-e) of seats (216a-e), and a battery compartment (218). Fuselage (212) includes a wall (220) that defines an interior (222) and exterior (224). Fuselage (212) may be incorporated into rotorcraft (10) in place of fuselage (16). Alternatively, fuselage (212) may be incorporated into rotorcraft (110) in place of fuselage (114). Additionally, fuselage (212) may be incorporated in place of the fuselage of fixed wing electric aircrafts.

Figure 3A:
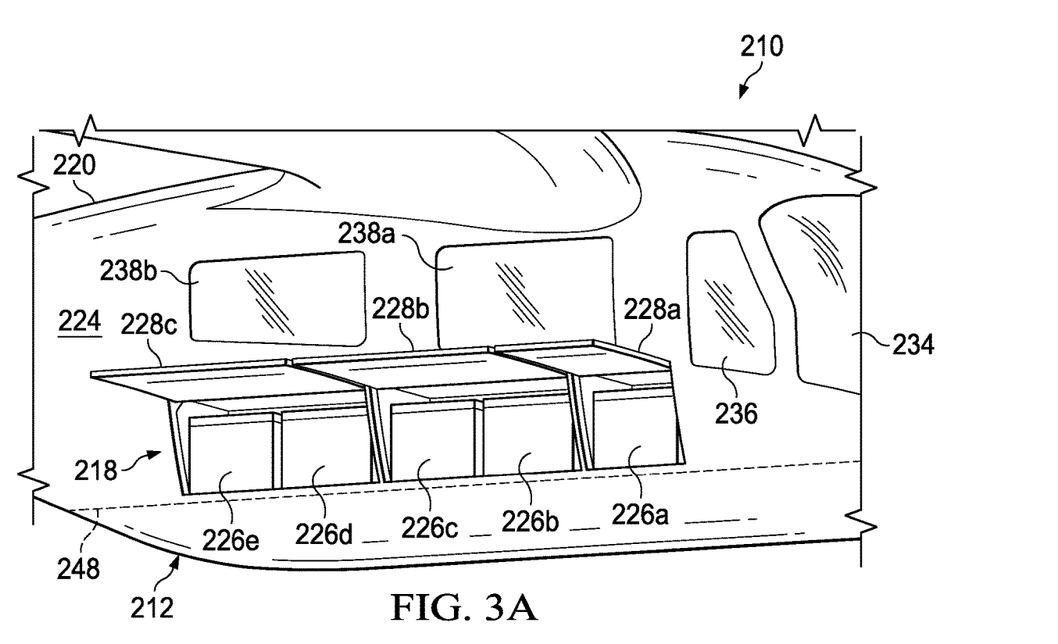
FIG. 3A is a side perspective view of a third exemplary electric aircraft that includes a first exemplary fuselage, where the fuselage includes access panels in an open configuration exposing a plurality of batteries.
Figure 3B:
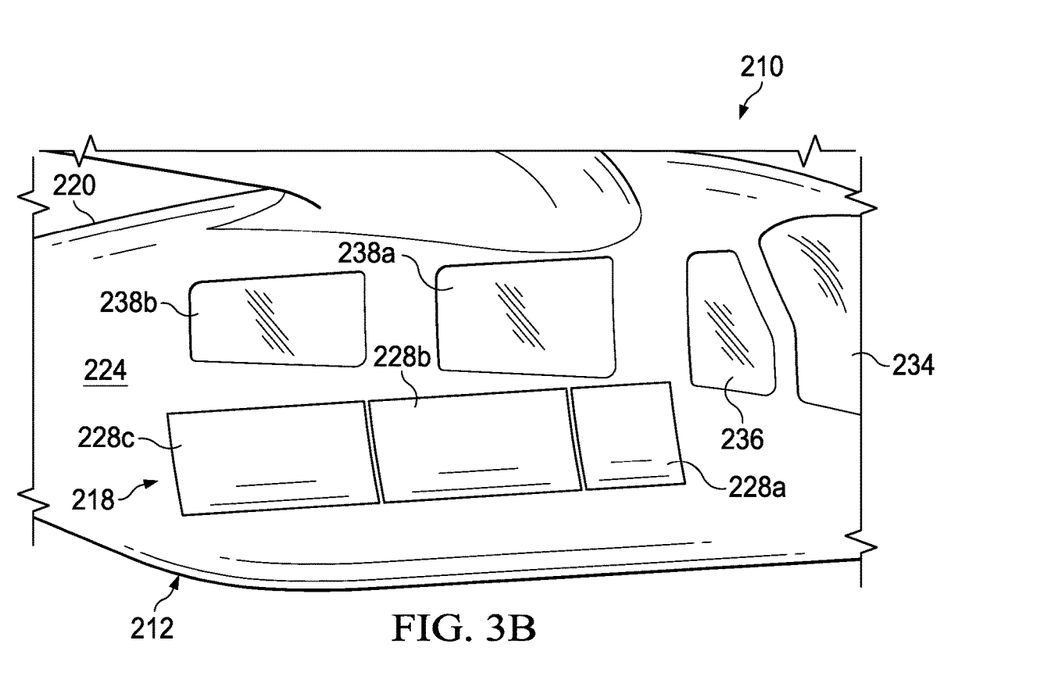
FIG. 3B is a side perspective view of the electric aircraft of FIG. 3A, but with the access panels in a closed configuration.

Battery compartment (218) includes at least one battery (with batteries (226a-e) being shown) configured to provide power to propel rotorcraft (210). As shown in FIGS. 3A-3B, battery compartment (218) includes access panels (228a-c) movable between open and closed configurations to access one or more batteries (226a-e) of battery compartment (218). More specifically, FIG. 3A shows a side perspective view of fuselage (212) that includes battery compartment (218), with access panels (228a-c) in an open configuration exposing batteries (226a-e). FIG. 3B shows a side perspective view of electric rotorcraft (210) of FIG. 3A, but with access panels (228a-c) in the closed configuration. As shown in FIG. 3A, battery (226a) is disposed in access panel (228a), batteries (226b-c) are disposed in access panel (228b), and batteries (226d-e) are disposed in access panel (228c). However, more or fewer access panels are envisioned, with such access panels capable of being moved between open and closed configurations using a variety of suitable structures.

Figure 5:
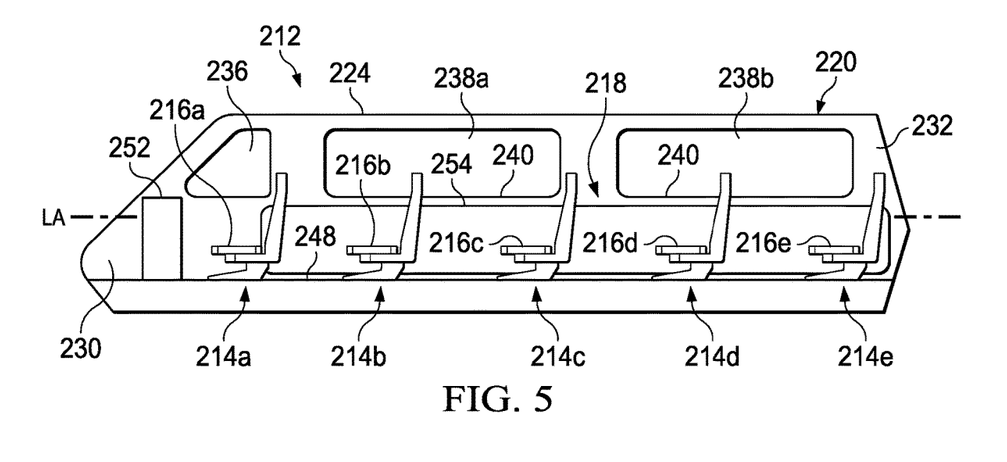
FIG. 5 is a schematic side elevation plan view of the fuselage of the electric aircraft similar to FIG. 4 but without passengers.

Access panels (228a-c) may be operated from exterior (224) of fuselage (212). This placement of batteries (226a-e) provides easy access to batteries (226a-e) from exterior (224) of fuselage (212) using access panels (228a-c) for recharging, inspection, and replacement. As shown, batteries (226a-e) are distributed along fore and aft portions (230, 232) of fuselage (212) which may manage longitudinal aircraft balance. Batteries (226a-e) may include a plurality of cells, which may be grouped in pouches or packages. Batteries (226a-e) may be used as a primary power source for propelling rotorcraft (210). In some examples, batteries (226a-e) include a battery management system comprising a housing, monitoring equipment and cooling equipment for monitoring batteries (226a-e) and managing an operating temperature of batteries (226a-e). For example, batteries (226a-e) may include one or more of a traction battery, an electric-vehicle battery, a secondary cell battery, a Lithium-ion, Lithium polymer battery, and/or any subsets or combinations thereof. Other types of batteries or battery technologies are compatible with the present disclosure. As shown, wall (220) of fuselage (212) includes a front cockpit window (234), a front passenger window (236), and side passenger windows (238a-b). Batteries (226a-e) may be placed along one side of fuselage (212) below windowsills (240) of side passenger windows (238a-b). A top surface (354) of battery compartment (318) is lower than the bottom of windowsills (240) of side passenger windows (238a-b). Top surface (354) of battery compartment (318) may be lower than the bottom of the windowsill of front passenger windows (236). As shown in FIGS. 3A and 5, battery compartment (218) is located at or above the level of floor (248) of the interior (222) of fuselage (212).

Figure 4:
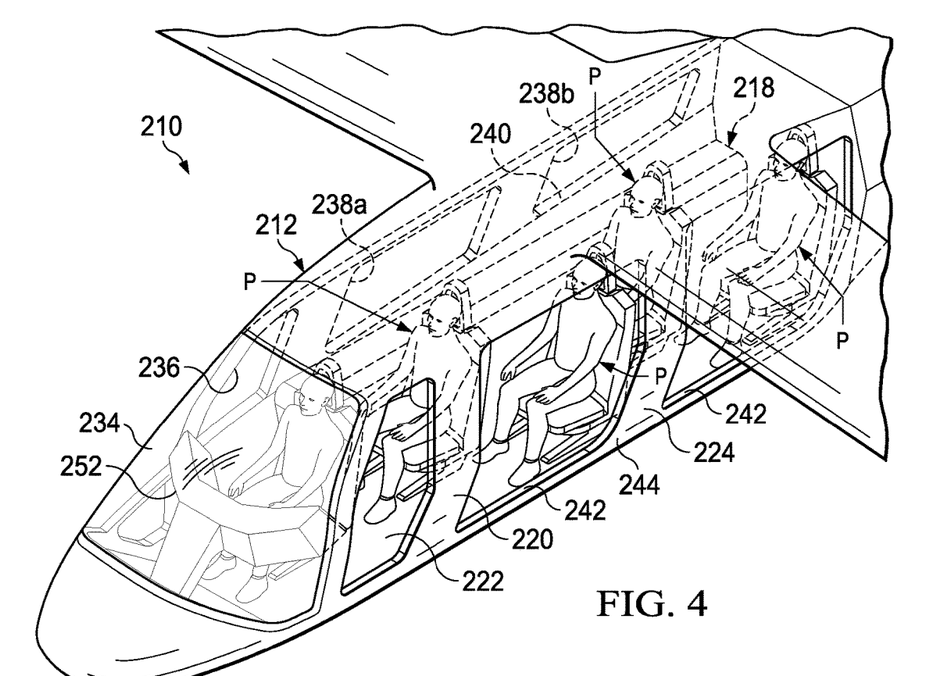
FIG. 4 is a top perspective view of the electric aircraft of FIG. 3A with passengers seated in seats within an interior of the fuselage.

Fuselage (212) is now described further with reference to FIGS. 4-7. FIG. 4 shows a top perspective view of rotorcraft (210) of FIG. 3A with passengers (P) seated in seats (216a-e) within an interior (222) of fuselage (212). FIG. 5 shows a schematic side plan view of fuselage (212) of rotorcraft (210) of FIG. 4, but without passengers (P). Battery compartment (218) is sized and configured to not impede a sight line of passengers (P) through side passenger windows (238a-b). Rotorcraft (210) includes at least one door (242) disposed in wall (220) of fuselage (212) configured to allow passenger to enter and exit fuselage (212). While two doors (242) are shown, more or fewer doors (242) are envisioned. Doors (242) may open vertically or horizontally using a variety of suitable mechanisms (e.g., hinges). FIG. 4 shows rotorcraft (210) as including wings (250) which may be similar to wings (120) described above. A passenger (P), e.g., a pilot, sitting in seat (214a) may control rotorcraft (210) using controls (252).

Figure 6:
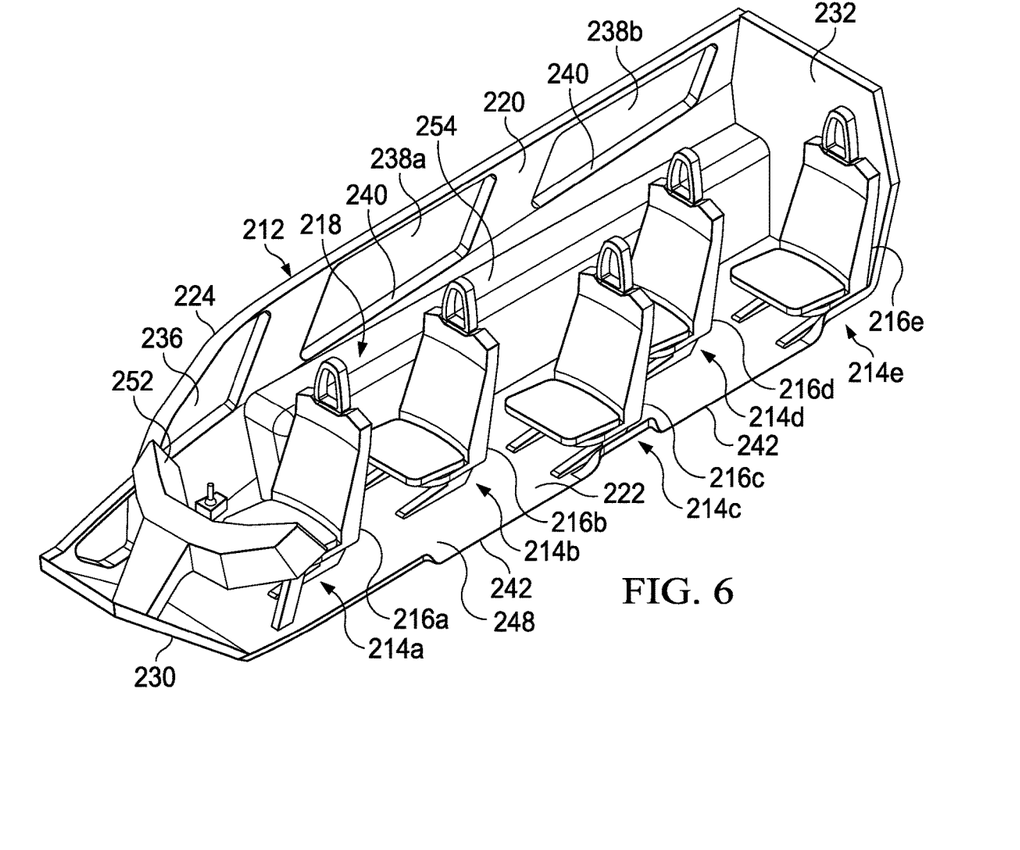
FIG. 6 is a top perspective view of fuselage of FIG. 4, but with a portion of the fuselage hidden to reveal a staggered positioning of the rows of seats relative to a battery compartment.
Figure 7:
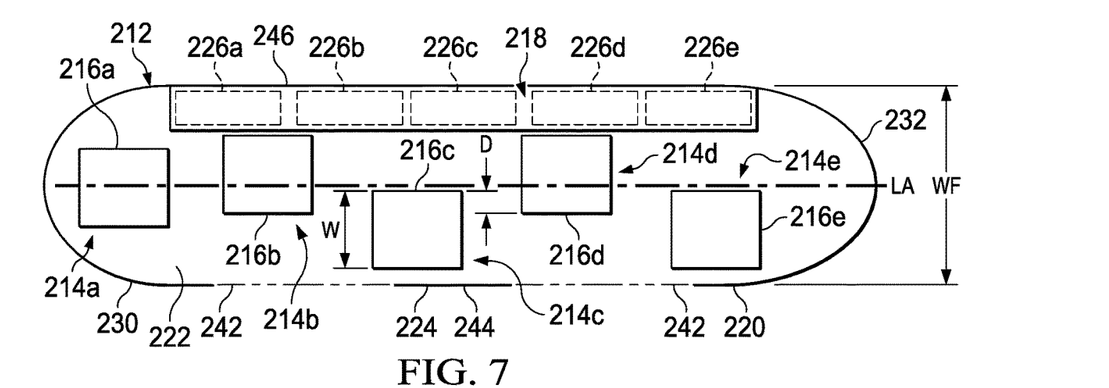
FIG. 7 is a top plan view of the fuselage of FIG. 6 showing the staggered positioning of the rows of seats relative to the battery compartment.

FIG. 6 shows a top perspective view of fuselage (212) of FIG. 4, but with a portion of fuselage (212) hidden to reveal a staggered positioning of rows of seats (216a-e) relative to battery compartment (218). FIG. 7 shows a top plan view of fuselage (212) of FIG. 6 showing staggered positioning of rows of seats (216a-e) relative to battery compartment (218). As shown in FIGS. 4-7, passenger rows (214a-e) of seats (216a-e) are disposed in interior (222) of fuselage (212). However, more or fewer passenger rows (214a-e) are also envisioned. As shown in FIG. 6, passenger row (214a) has a single seat (216a) configured to support a passenger (P), passenger row (214b) has a single seat (216b) configured to support a passenger (P), passenger row (214c) having a single seat (216c) configured to support a passenger (P), passenger row (214d) having a single seat (216d) configured to support a passenger (P), and passenger row (214e) has a single seat (216e) configured to support a passenger (P). In other words, seat (216a) is only seat in a passenger row (214a), and second seat (216b) is only seat in a second passenger row (214b). Seats (216a-e) are arranged in single file so that entry from one side appropriate through passenger doors (242). In other words, access to passenger seats (216a-e) is through passenger doors (242) on opposite side of fuselage (212) from batteries (226a-e). Single file seating (i.e., one seat per row) may minimize aircraft frontal area while providing sufficient perceived cabin space with extra width above battery compartment (218).

As shown in FIG. 7, fuselage (212) can extend along a longitudinal axis (LA). Longitudinal axis (LA) of fuselage (212) defines left and right lateral sides (244, 246). Passenger seats (216a-e) are not laterally symmetrical along the longitudinal axis (LA) of fuselage (212). Passenger seats (216b-e) biased to one of left and right lateral sides (244, 246). As shown in FIGS. 5-7, seats (216a-e) are staggered along longitudinal axis (LA), such that seats (216a-e) do not extend in a straight line parallel to longitudinal axis (LA). Each seat (216a-e) has a seat width (W). Seats (216a-e) are staggered along longitudinal axis (LA) by a distance (D) that is less than seat width (W). However, this distance (D) may vary depending on the seat width (W) and the width of fuselage (WF). Battery compartment (218) is located laterally adjacent to seat (216b-e) along longitudinal axis (LA). Battery compartment (218) is located laterally adjacent to passenger rows (214b-e) along longitudinal axis (LA). As used herein, laterally adjacent means next to left lateral side (244) or next to right lateral side (246) when viewed from above (see FIGS. 7, 9, 11, and 13). Laterally adjacent is not intended to refer to where battery compartment (218 is completely above seats (216a-e) or completely below seats (216a-e). As shown, battery compartment (218) is disposed on right lateral side (246) of fuselage (212). Battery compartment (218) is mechanically and thermally isolated from interior (222) of fuselage (212).

B. Second Exemplary Fuselage

Figure 8:
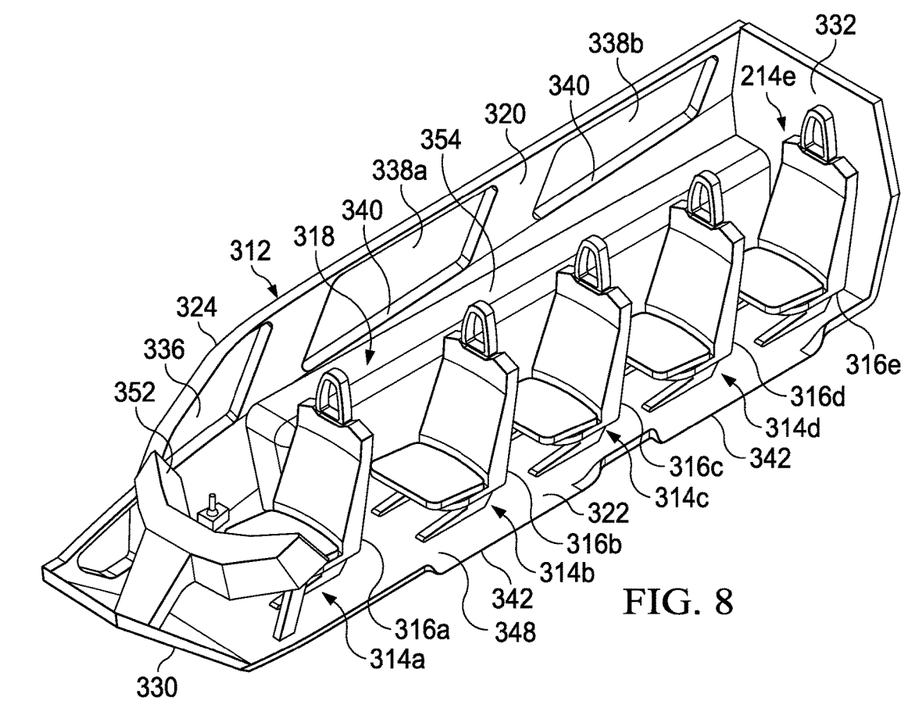
FIG. 8 is a top perspective view of a second exemplary fuselage similar to the fuselage of FIG. 6, but with a straight-line positioning of the rows of the seats relative to a battery compartment.
Figure 9:
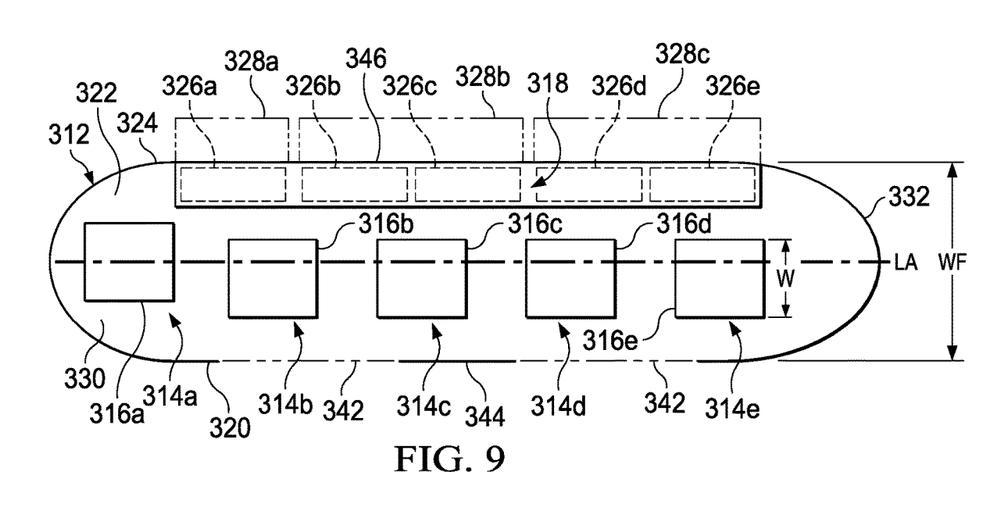
FIG. 9 is a top plan view of the fuselage of FIG. 8 showing the straight-line positioning of the rows of seats relative to the battery compartment.

FIG. 8-9 show a second exemplary fuselage (312), which is substantially similar to fuselage (212) described above with reference to FIGS. 3A-7. Similar to fuselage (212), fuselage (312) includes a plurality of rows (314a-e) of seats (316a-e), a battery compartment (318), a wall (320), an interior (322), an exterior (324), a plurality of batteries (326a-e), a plurality of access panels (328a-c), a fore portion (330), an aft portion (332), a front cockpit window (not shown), a front passenger window (336), a side passenger window (338a-b), windowsills (340), doors (342), a left lateral side (344), a right lateral side (346), a floor (348), and controls (352). These features are substantially similar to those described above with reference to fuselage (212).

Unlike fuselage (212), rows (314b-e) of seats (316b-e) of fuselage (312) may be offset a distance relative to longitudinal axis (LA) and arranged in a straight-line relative to battery compartment (318). While not shown, in some versions, passenger seats (316a-e) may be arranged in a single row that extends in a straight line parallel to or colinear with longitudinal axis (LA). Battery compartment (318) is located laterally adjacent to passenger rows (314b-e) along longitudinal axis (LA). As shown, battery compartment (318) is disposed on right lateral side (346) of fuselage (312). Battery compartment (318) is mechanically and thermally isolated from interior (322) of fuselage (312). A top surface (354) of battery compartment (318) is lower than the bottom of windowsills (340) of side passenger windows (338a-b). Top surface (354) of battery compartment (318) may be lower than the bottom of the windowsill of front passenger window (336). FIG. 9 shows access panels (328a-c) in a closed position but rotatable to open configuration using dashed lines. Similar to access panels (228a-c), access panels (328a-c) may be operated from exterior (324) of fuselage (312). This placement of batteries (326a-e) provides easy access to batteries (326a-e) from exterior (324) of fuselage (312) using access panels (328a-c) for recharging, inspection, and replacement.

C. Third Exemplary Fuselage

Figure 10:
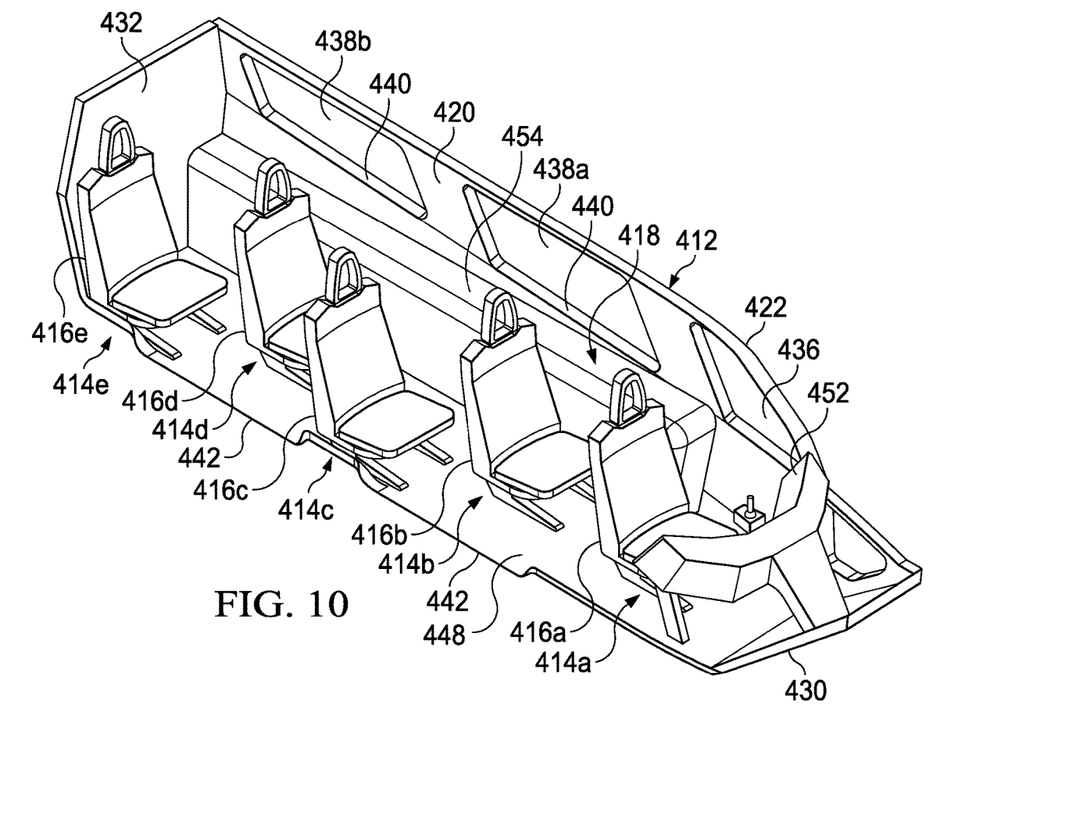
FIG. 10 is a top perspective view of a third exemplary fuselage similar to the fuselage of FIG. 6, but with the battery compartment disposed on an opposite lateral side relative to the fuselage of FIG. 6.
Figure 11:
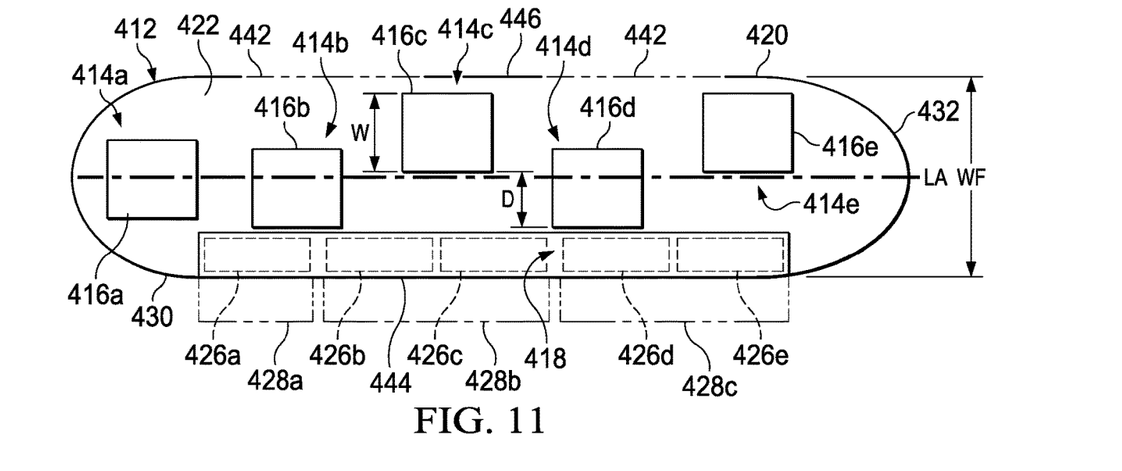
FIG. 11 is a top plan view of the fuselage of FIG. 10 showing the staggered positioning of the rows of seats relative to the battery compartment.

FIG. 10-11 show a third exemplary fuselage (412), which is substantially similar to fuselage (212) described above with reference to FIGS. 3A-7. Similar to fuselage (212), fuselage (412) includes a plurality of rows (414a-e) of seats (416a-e), a battery compartment (418), a wall (420), an interior (422), an exterior (424), a plurality of batteries (426a-e), a plurality of access panels (428a-c), a fore portion (430), an aft portion (432), a front cockpit window (not shown), a front passenger window (436), a side passenger window (438a-b), windowsills (440), doors (442), a left lateral side (444), a right lateral side (446), a floor (448), and controls (452). These features are substantially similar to those described above with reference to fuselage (212).

Battery compartment (418) is located laterally adjacent to seats (416b-e) of rows (414b-e) of along longitudinal axis (LA). Particularly, battery compartment (418) is located laterally adjacent to along longitudinal axis (LA). Battery compartment (418) is mechanically and thermally isolated from interior (422) of fuselage (412). Unlike fuselage (212), battery compartment (418) is located at left lateral side (444) instead of right lateral side (446). As a result, doors (442) are located opposite battery compartment (418) on right lateral side (446). Similar to fuselage (212), rows (414a-e) of seats (416a-e) of fuselage (412) are arranged in a staggered positioning relative to battery compartment (418). Passenger seats (416a-e) are staggered along longitudinal axis (LA) by a distance (D) that is less than seat width (W). However, this distance (D) may vary depending on the seat width (W) and the width of fuselage (WF). A top surface (454) of battery compartment (418) is lower than the bottom of windowsills (440) of side passenger windows (438a-b). Top surface (454) of battery compartment (418) may be lower than the bottom of the windowsill of front passenger windows (436).

FIG. 11 shows access panels (428a-c) in a closed configuration but rotatable to open configuration using dashed lines. Similar to access panels (228a-c), access panels (428a-c) may be operated from exterior (424) of fuselage (412). This placement of batteries (426a-e) provides easy access to batteries (4326a-e) from exterior (424) of fuselage (412) using access panels (428a-c) for recharging, inspection, and replacement.

D. Fourth Exemplary Fuselage

Figures 12, 13:
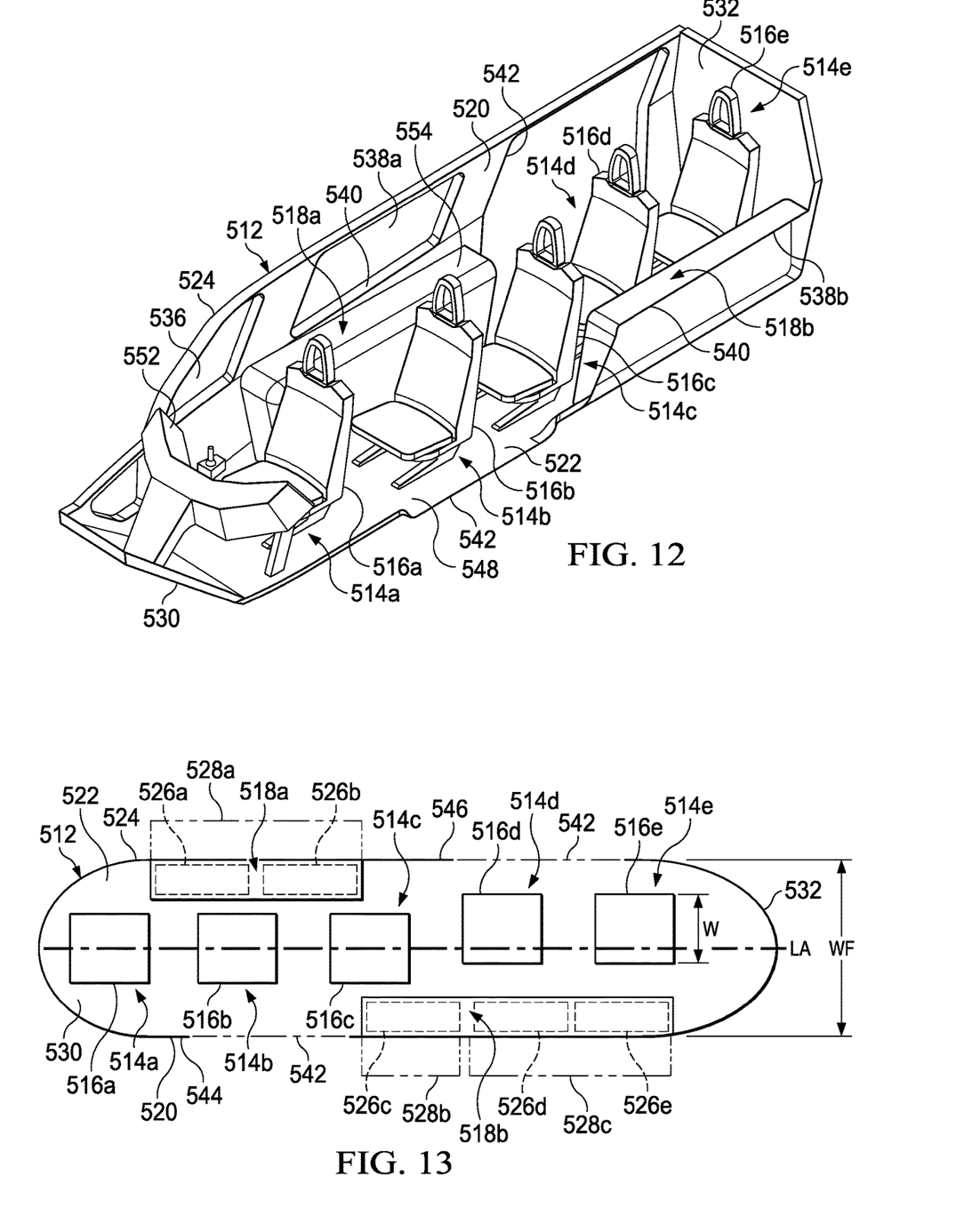
FIG. 12 is a top perspective view of a fourth exemplary fuselage similar to the fuselage of FIG. 6, but with a staggered positioning of the rows of the seats relative to opposing battery compartments and opposing doors.
FIG. 13 is a top plan view of the fuselage of FIG. 12 showing the staggered positioning of the rows of seats relative to the opposing battery compartments and the opposing doors.

FIGS. 12-13 show a fourth exemplary fuselage (512), which is substantially similar to fuselage (212) described above with reference to FIGS. 3A-7. Similar to fuselage (212), fuselage (512) includes a plurality of rows (514a-e) of seats (516a-e), a battery compartment (518), a wall (520), an interior (522), an exterior (524), a plurality of batteries (526a-e), a plurality of access panels (528a-c), a fore portion (530), an aft portion (532), a front cockpit window (not shown), a front passenger window (536), a side passenger window (538a-b), windowsills (540), doors (542), a left lateral side (544), a right lateral side (546), a floor (548), and controls (552). These features are substantially similar to those described above with reference to fuselage (212).

Similar to fuselage (212), rows (514a-e) of seats (516a-e) of fuselage (512) are arranged in a staggered arrangement relative to battery compartment (518). However, the staggered arrangement of rows (514a-e) of seats (216a-e) is different than rows (214a-e) of seats (216a-e). Unlike fuselage (212) that shows a single battery compartment (518), fuselage (512) includes battery compartments (518a-b). As shown, battery compartment (518a) houses batteries (526a-b), and battery compartment (518b) houses batteries (526c-e). Battery compartment (518a) is disposed on right lateral side (546) of fuselage (512) and is laterally adjacent seats (516b-c) of rows (514b-c). Battery compartment (518b) is disposed on left lateral side (544) of fuselage (512) and is laterally adjacent seats (516c-e) of rows (514c-e). Batteries (526a-e) are configured to provide power to propel the rotorcraft, e.g. rotorcraft (510). Top surfaces (554) of battery compartments (518a-b) are lower than the bottom of windowsills (540) of side passenger windows (538a-b). Top surface (554) of battery compartment (518) may be lower than the bottom of the windowsill of front passenger windows (536).

FIG. 13 shows access panels (528a-c) in a closed configuration, but rotatable to open configuration using dashed lines. Similar to access panels (228a-c), access panels (528a-c) may be operated from exterior (524) of fuselage (512). This placement of batteries (526a-e) provides easy access to batteries (526a-e) from exterior (524) of fuselage (512) using access panels (528a-c) for recharging, inspection, and replacement. Unlike fuselage (212), doors (542) of fuselage (512) are disposed on opposite left and right lateral sides (544, 546) of fuselage (512).

E. Exemplary Method of Manufacturing Aircraft

Figure 14:
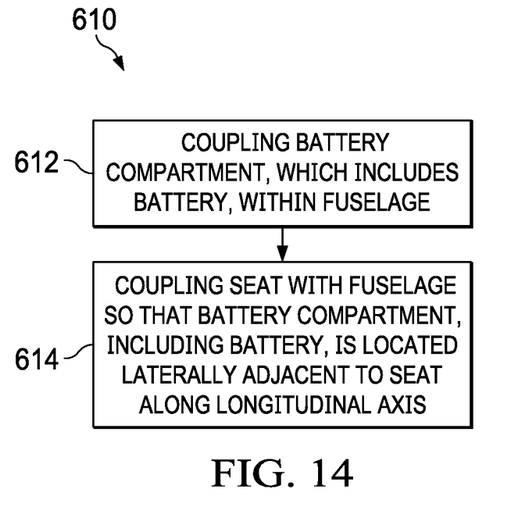
FIG. 14 depicts an exemplary method of manufacturing the aircraft of FIG. 4.

A method of manufacturing aircraft (e.g., rotorcraft (200)) is described below with reference to FIG. 14. At step (312), method (310) includes coupling battery compartment (218, 318, 418, 518), which includes a battery (226a-e, 326a-e, 426a-e, 526a-e), within fuselage (212, 312, 412, 512) of rotorcraft (200). Fuselage (212, 312, 412, 512) extends along longitudinal axis (LA). Batteries (226a-e, 326a-e, 426a-e, 526a-e) are configured to provide power to propel rotorcraft (200).

At step (314), method (310) may include coupling a seat (216a-e, 316a-e, 416a-e, 516a-e) of row (214a-e, 314a-e, 414a-e, 514a-e) with fuselage (212, 312, 412, 512) so that battery compartment (218, 318, 418, 518), including batteries (226a-e, 326a-e, 426a-e, 526a-e), are located laterally adjacent to seat (216b-e, 316b-e, 416b-e, 516b-e) along longitudinal axis (LA). Each seat (216a-e, 316a-e, 416a-e, 516a-e) is configured to support a passenger. Method (310) may also include connecting access panels (228a-c, 328a-c, 428a-c, 528a-c) with battery compartment (218, 318, 418, 518). Access panels (228a-c, 328a-c, 428a-c, 528a-c) may be connected with battery compartments (218, 318, 418, 518) using a variety of suitable structures. Access panels (228a-c, 328a-c, 428a-c, 528a-c) are movable between open and closed configurations to access batteries (226a-e, 326a-e, 426a-e, 526a-e) in battery compartment (218, 318, 418, 518) from exterior (224, 324, 424, 524) of fuselage (212, 312, 412, 512).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aircraft comprising:
   (a) a fuselage extending along a longitudinal axis;
   (b) first and second seats positioned within the fuselage and arranged in single file, wherein the first and second seats are configured to support first and second passengers, wherein the first seat is the only seat in a first passenger row, wherein the second seat is the only seat in a second passenger row; and
   (c) a battery compartment that includes first and second batteries configured to provide power to propel the aircraft, wherein the first and second batteries are located within the fuselage and positioned laterally adjacent to the first and second seats along the longitudinal axis.

2. The aircraft of claim 1, wherein the first and second seats extend in a straight line parallel to the longitudinal axis.

3. The aircraft of claim 1, wherein the first and second seats are staggered along the longitudinal axis such that the first and second seats do not extend in a straight line parallel to the longitudinal axis.

4. The aircraft of claim 1, wherein the fuselage has an exterior, wherein the battery compartment includes an access panel movable between open and closed configurations to access the battery of the battery compartment from the exterior of the fuselage.

5. The aircraft of claim 4, the battery compartment further comprising:
   (i) a third battery located within the fuselage, and
   (ii) a second access panel movable between open and closed configurations to access the third battery of the battery compartment.

6. The aircraft of claim 5, the battery compartment further comprising:
   (i) a fourth battery located within the fuselage, and
   (ii) a third access panel movable between open and closed configurations to access the fourth battery of the battery compartment from the exterior of the fuselage.

7. The aircraft of claim 1, the aircraft further comprising a second battery compartment that includes a battery configured to provide power to propel the aircraft.

8. The aircraft of claim 7, wherein the fuselage includes first and second lateral sides, wherein the battery compartment is disposed in the first lateral side of the fuselage, wherein the second battery compartment is disposed in the second lateral side of the fuselage.

9. The aircraft of claim 1, wherein the aircraft includes at least one passenger window, wherein the battery compartment is sized and configured to not impede a sight line of the passenger through the window.

10. The aircraft of claim 9, wherein the fuselage has an interior surface that defines an interior, wherein the battery compartment is mechanically and thermally isolated from the interior of the fuselage.

11. The aircraft of claim 1, wherein the aircraft includes at least one door configured to allow the passenger to enter and exit the fuselage.

12. The aircraft of claim 11, wherein the at least one door comprises first and second doors are disposed on opposite lateral sides of the fuselage.

13. The aircraft of claim 1, wherein the aircraft is a fixed wing aircraft or a rotorcraft configured for vertical takeoff and landing.

14. An aircraft comprising:
   (a) a fuselage extending along a longitudinal axis, wherein the fuselage has an interior and an exterior;
   (b) a plurality of seats disposed in the interior of the fuselage, the plurality of seats comprising:
      (i) a first seat configured to support a first passenger, and
      (ii) a second seat configured to support a second passenger, wherein the first and second seats are arranged in single file and positioned at the same vertical height but do not extend in a straight line parallel to the longitudinal axis; and
   (c) a battery compartment comprising:
      (i) a battery configured to provide power to propel the aircraft, wherein the battery compartment, including the battery, is located laterally adjacent to at least one of the first and second seats along the longitudinal axis, and
      (ii) an access panel movable between open and closed configurations to access the battery in the battery compartment from the exterior of the fuselage.

15. The aircraft of claim 14, wherein the plurality of seats further comprises a third seat configured to support a third passenger, wherein the first, second, and third seats are arranged in single file, the aircraft further comprising a second battery compartment that includes a second battery configured to provide power to propel the aircraft, wherein the second battery compartment, including the second battery, is located laterally adjacent to the third seat along the longitudinal axis.

16. The aircraft of claim 14, wherein the aircraft is a fixed wing aircraft or a rotorcraft configured for vertical takeoff and landing.

17. A method of manufacturing an aircraft, the method comprising:
   (a) positioning first and second batteries within a fuselage of the aircraft, wherein the fuselage extends along a longitudinal axis and includes first and second lateral sides, wherein the first and second batteries are configured to provide power to propel the aircraft; and
   (b) coupling first and second seats in single file within the fuselage, wherein the first and second batteries are located within the fuselage laterally adjacent to the first and second seats along the longitudinal axis, wherein the first and second seats are configured to support first and second passengers, wherein the first seat is the only seat in a first passenger row, wherein the second seat is the only seat in a second passenger row.

18. The method of claim 17, further comprising connecting an access panel with the fuselage, wherein the access panel is movable between open and closed configurations to access the first and second batteries from an exterior of the fuselage.

19. The aircraft of claim 14, wherein the first seat is the only seat in a first passenger row, wherein the second seat is the only seat in a second passenger row.

20. The method of claim 17, further comprising connecting a second access panel with the fuselage, wherein the second access panel is movable between open and closed configurations to access a third battery from an exterior of the fuselage, wherein the access panel and the second access panel are both disposed in the first lateral side of the fuselage.

* * * * *